United States Patent [19]
Roberts

[11] Patent Number: 5,139,279
[45] Date of Patent: Aug. 18, 1992

[54] PARALLEL-ALIGNED ALL-WHEEL STEERED VEHICLE

[76] Inventor: Brock F. Roberts, 1516 LeRoy Ave., Berkeley, Calif. 94708

[21] Appl. No.: 594,975

[22] Filed: Oct. 10, 1990

[51] Int. Cl.⁵ .............................................. B62D 7/14
[52] U.S. Cl. ........................................ 280/91; 280/98; 280/99; 180/79; 180/89.13
[58] Field of Search ...................... 280/91, 99, 98, 101; 180/89.13, 212, 327, 9.23, 79

[56] References Cited

U.S. PATENT DOCUMENTS

| | | | |
|---|---|---|---|
| 1,302,577 | 5/1919 | Moser | 180/9.23 |
| 4,664,213 | 5/1987 | Lin | 280/91 |

FOREIGN PATENT DOCUMENTS

| | | | |
|---|---|---|---|
| 0495224 | 3/1976 | U.S.S.R. | 280/91 |
| 1217285 | 12/1970 | United Kingdom | 180/79.1 |

*Primary Examiner*—Charles A. Marmor
*Assistant Examiner*—Anne Marie Boehler

[57] ABSTRACT

An all-wheel steered vehicle in which all wheels are always parallel and have an equal role in steering the vehicle. It consists of a plurality of wheel assemblies capable of wheel rotation about the wheel's axis and wheel assembly rotation about the wheel's vertical axis. These wheel assemblies are fixed normally to (at right angles to) and evenly spaced around a circle on the chassis (17). These wheel assemblies are attached to a common linkage (18) which maintains the wheels in parallel, but allow the wheel assemblies to rotate simultaneously about their vertical axes. The cab (21) of this vehicle is rotatable about the center of the circular chassis in a plane parallel to the chassis. The cab is in linkage with the wheel assembly's linkage such that a rotation of the cab relative to the chassis causes a simultaneous and equal rotation of all of the wheel assemblies about their vertical axis. That is, both the cab and all of the wheels are maintained parallel to one another. The steering mechanism is such that turning the steering wheel (23) in the cab, rotates the cab with respect to the chassis and simultaneously rotates all the wheels on their vertical axes, changing the direction of the vehicle. All wheels have an equal role in steering the vehicle.

2 Claims, 2 Drawing Sheets

PARALLEL-ALIGNED ALL-WHEEL STEERED VEHICLE

BACKGROUND-FIELD OF INVENTION

This invention relates to all wheel-steered vehicles.

BACKGROUND-DESCRIPTION OF PRIOR ART

Almost all wheeled vehicle designs descend from a common predecessor, that is a rectangular chassis with parallel axles and four wheels that are essentially in line with opposing sides of the rectangle. There have been a number of variations and improvements on this basic design including all-wheel steering systems, but all are lacking in at least some of the following ways:

(a) All wheels do not play an equal role in steering the vehicle. When the direction of the steering wheels is changed from the direction the vehicle is moving, the friction force between the steering wheels and the ground, changes the vehicle's direction. The friction force, or traction would be maximized if the entire weight of the vehicle rested over the steering wheels. In all-wheel steering systems for automobiles, this idea is approached, but the rear wheels play only a secondary role in the steering of the vehicle. It would be a benefit if all wheels played an equal role in steering the vehicle.

(b) Each wheel rotates at different rates unless the vehicle is moving in a straight line. When most wheeled vehicles negotiate a turn, the wheels on the inside of the turn rotate at a slower rate than the outside wheels, complicating the drive system. If all wheels rotated at the same rate at all times, drive and braking designs could be simplified and the stability of the vehicle in turns, especially during acceleration and braking could be increased.

(c) Existing vehicle designs require a cumbersome turning radius. It would be beneficial in many applications to have a turning radius approaching zero, or zero.

(d) In most conventional steering systems, to change the direction of the vehicle, the steering wheels' direction are changed from the vehicle's direction of motion The friction between the road and the steering wheels push the front of the vehicle to a new direction (assuming a front-wheel steered vehicle), and trailing wheels follow. This system has been greatly improved by the more recent four-wheel steering whereby the rear wheels play a more active role. But responsiveness would be increased dramatically if all of the wheels and the cab changed direction equally and simultaneously in response to the operator's command.

(e) When a vehicle negotiates a turn, the entire mass must rotate about the vehicle's vertical axis. The force that rotates it, required by the vehicle's moment of inertia is transferred from the tire's traction, decreasing its cornering ability. If only the essential components of the vehicle rotated through a turn, its effective moment of inertia would decrease, decreasing the fraction of the vehicle's traction used to rotate the vehicle, improving cornering.

(f) Most steering systems require the operator to turn the steering wheel in the initial part of a turn, then return the wheel to its original position at the completion of the turn. This return is a point of vulnerability. Loss of control is a danger, especially when the turn is sharp and there is a tendency to let go of the wheel and let it automatically return. It would be a benefit for the steering system to be such that the steering wheel is rotated through the turn, but does not require a return after the curve has been negotiated.

OBJECTS AND ADVANTAGES

Accordingly several objects and advantages of this invention are:

(a) To provide a vehicle in which all wheels play an equal role in steering by creating a system where all the wheels of the vehicle steer, and all are always parallel to one another. The entire weight of the vehicle rests on primary steering wheels. Depending on the weight distribution of the vehicle, each wheel equally applies traction to change the direction of the vehicle. This design increases traction and stability, increases responsiveness, and improves safety and performance.

(b) To provide a vehicle in which all wheels rotate at the same rate independent of the path negotiated. This not only simplifies the drive and braking systems, but also increases the vehicle's stability in turns, especially during acceleration or braking, improving safety and performance.

(c) To provide a vehicle which has a turning-radius of zero or that approaches zero. This would improve maneuverability substantially and be very beneficial in many situations and applications.

(d) To provide a highly responsive vehicle, a vehicle in which all wheels steer, and the cab is rotatable. When the steering wheel in the cab is rotated, the direction of all the wheels, the cab, and the vehicle's heading are changed, simultaneously and equally.

(e) To provide a vehicle in which only the essential components rotate when it rounds a turn. By creating a vehicle whose chassis is directionally constant throughout a turn, the vehicle's effective moment of inertia is decreased. This decreases the force required to change the vehicle's direction, allowing more of the frictional force between wheels to ground be used in increasing the vehicle's cornering ability.

(f) To provide a steering system such that the steering wheel is rotated through a turn, but does not require a return after the curve has been negotiated. This alleviates the danger of loss of control at the completion of a turn, especially a sharp turn, when in a conventional system, the wheel must be rotated back to its original position. In this steering system the steering wheels and cab are always facing the direction the vehicle is moving. The steering wheel requires no return upon completion of a turn.

Further objects and advantages of the invention will become apparent from a consideration of the drawings and ensuing description.

DRAWING FIGURES

Figure 1:
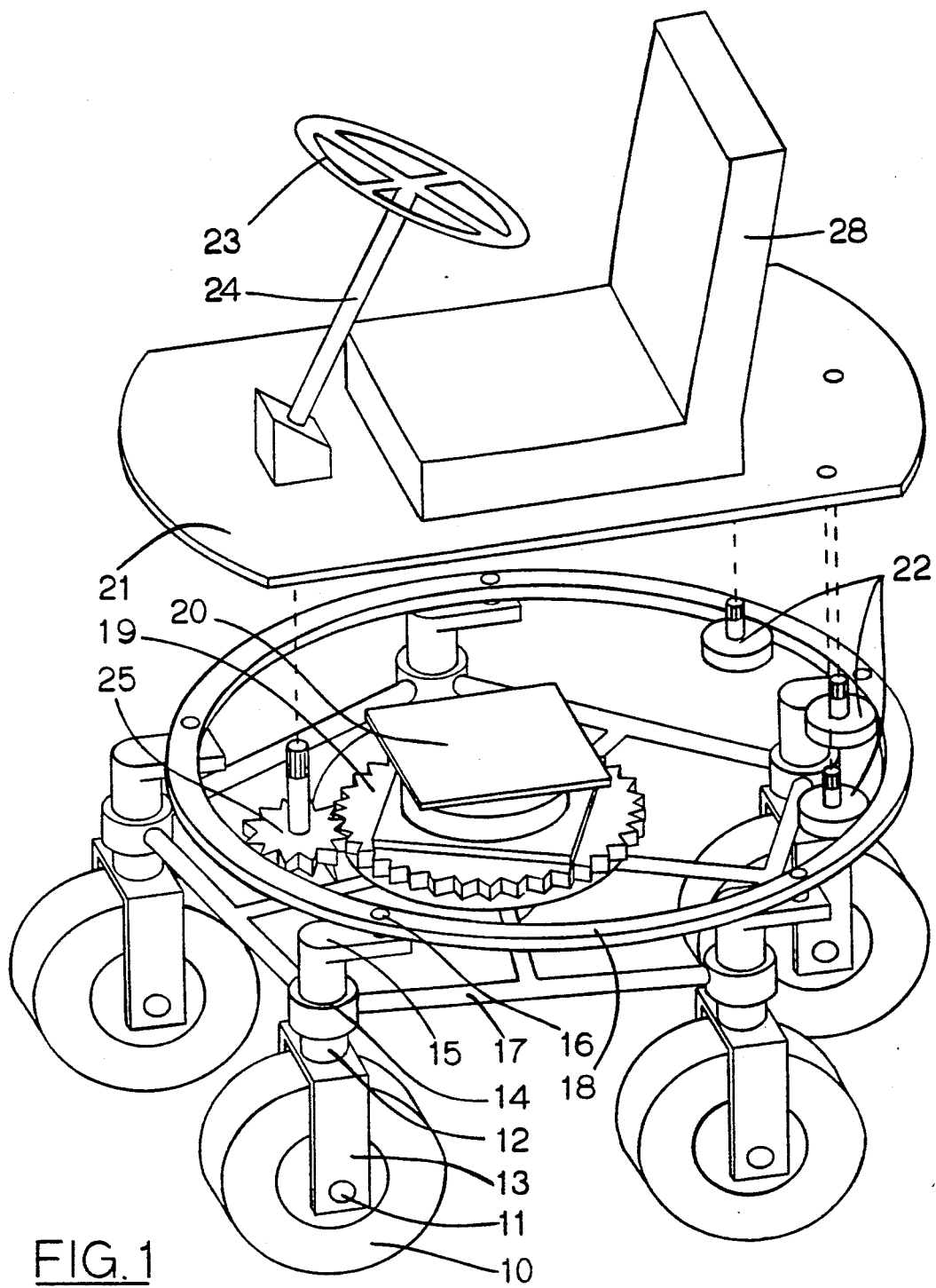
FIG. 1 is a perspective, exploded view of the invention.

Reference Numerals in Drawings:
10 WHEEL
11 AXLE
12 VERTICALLY ROTATABLE SHAFT
13 SUPPORT BAR OR FORK
14 BEARING SURFACE
15 LEVER ARM 16 BEARING PIN
17 CHASSIS
18 LINKAGE RING
19 CHASSIS GEAR
20 ROTATABLE PLATFORM
21 CAB
22 ROLLERS
23 STEERING WHEEL
24 STEERING SHAFT
25 STEERING GEAR
28 SEAT

DETAILED DESCRIPTION OF THE EMBODIMENT ILLUSTRATED

Figure 3:
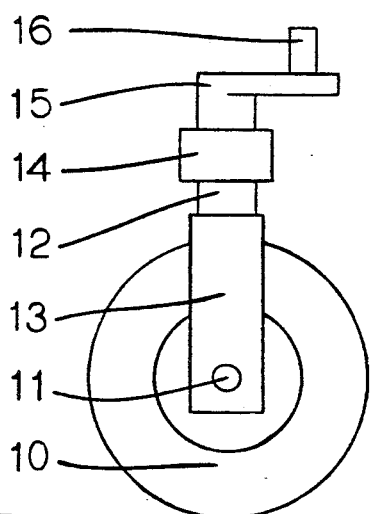
FIG. 3 shows a side and front view of an individual wheel assembly.
Figure 4:
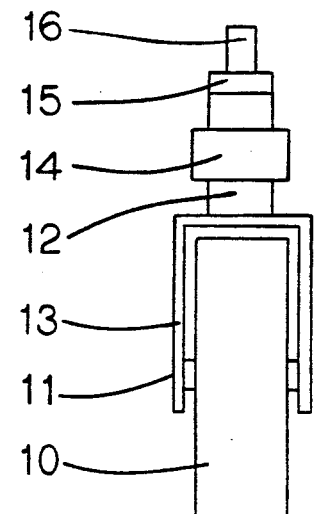
FIG. 4 shows a front view of an individual wheel assembly.

In FIG. 3 there is shown a detail of an individual wheel assembly. A wheel (10) is supported by its axle (11) to a vertically rotatable shaft (12) by a support bar or fork (13). The wheel is supported essentially vertically. The wheel assembly is fastened to the chassis by a bearing surface (14) that supports the rotatable shaft. The top of the rotatable shaft is fastened to a lever arm (15). This lever arm is perpendicular to the shaft in the same plane as the wheel. Because the assembly is fastened to the chassis by a bearing surface (14), the direction of the wheel can be controlled by the lever arm (15). FIG. 1 shows a perspective, exploded view of the invention. The chassis (17) is substantially a flat ring shape. The wheel assemblies are fastened normally (at right angles to) and spaced evenly around a circle on the chassis. The number of wheel assemblies depends upon the application of the vehicle, for as few as three, to as many as needed. The shape of the chassis, therefore, could be adapted accordingly to a square, pentagon, etc. Bearing pins (16) of each wheel assembly are attached vertically to the end of the lever arm (15) and are allowed to rotate freely above the vertical axes through the center. A linkage ring (18) has mounting holes for the bearing pins spaced evenly about a circle equal to the circle in which the wheel assemblies are fastened around on the chassis. The bearing pins are attached to their corresponding holes on the linkage. The wheel assemblies are now attached in common linkage which maintains the wheels in a parallel position but allows the wheel assemblies to rotate simultaneously about the vertical axes by manipulating the linkage ring. The direction of the wheels can be steered freely beyond or within 360 degrees. How this linkage is manipulated will now be explained.

Centered on the chassis is mounted a fixed chassis gear (19). The cab is attached to the vehicle but is allowed to rotate about the vehicle's center on a plane parallel to the chassis. To achieve this rotation, a rotatable platform (20) is centered on the chassis and mounted on the chassis gear (19). The cab is fixed on this rotatable platform. The linkage ring's center is essentially offset from the chassis center by the length of a lever arm. Rollers (22) fixed to the underside of the cab engage with the ring so that the rotation of the cab with respect to the chassis manipulates the linkage ring and causes a simultaneous and equal rotation of all the wheel assemblies about their vertical axes.

A steering wheel (23) is attached to a steering shaft (24) which passes vertically through the cab floor. Directly under the cab floor the steering shaft is attached to the steering gear (25) which meshes with the chassis gear (19). Thus, the operator sitting on the seat (28) turns the steering wheel, rotating the cab relative to the chassis, and simultaneously and equally rotating the wheel assemblies about their vertical axes, changing the direction of the vehicle.

Figure 2:
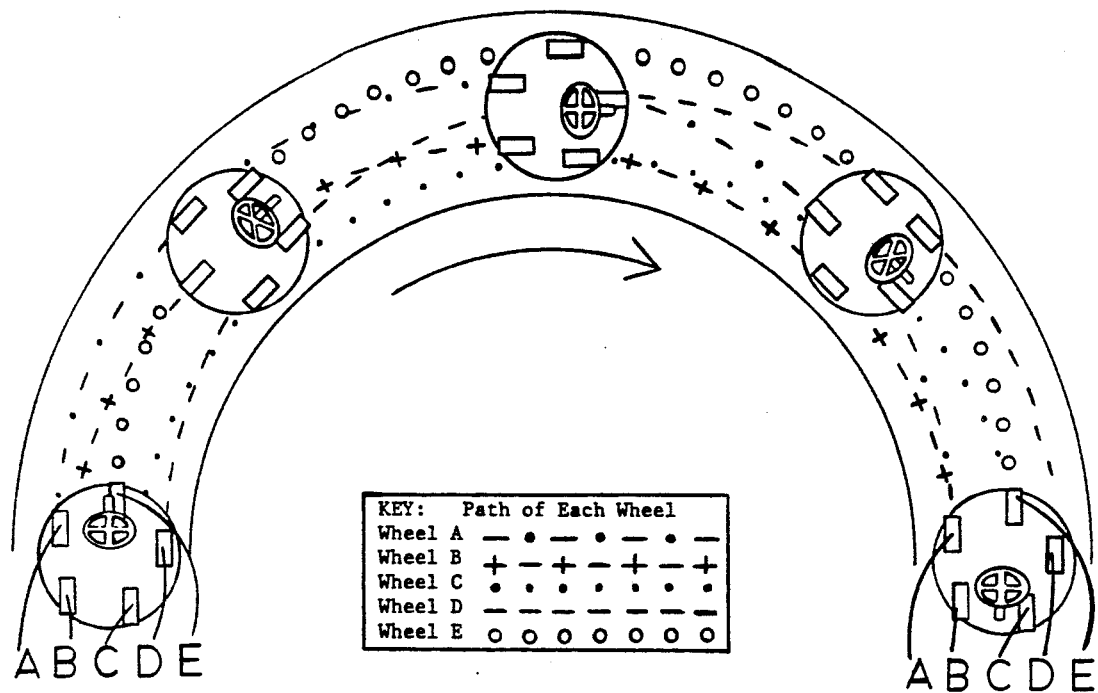
FIG. 2 illustrates how the vehicle's wheels track around a curve.

In FIG. 2 the tracks of each wheel are traced as the vehicle turns a corner. The view is from above looking down on the tracks of a vehicle shown in (5) positions the vehicle is depicted as transparent so the wheels can be seen. The vehicle travels from left to right and each type of dotted line tracks the path of each wheel. The little steering wheel points the way. Because the cab rotates relative to the chassis, and the wheels rotate about their individual vertical axes, the vehicle goes through the turn, changing its direction 180 degrees, but the chassis remains directionally constant. Thus each wheel remains parallel to one another, rolling out an equal arc and travelling at the same rate throughout the turn.

SUMMARY, RAMIFICATIONS AND SCOPE

In the vehicle described above, the cab and wheels point in the direction of motion. This direction of motion is changed by rotating the steering wheel which simultaneously changes the direction of all the wheels and the cab. Thus, all wheels equally share the role of steering the vehicle in that they are always directionally equal and depending on weight distribution, they equally apply traction to change the direction of the vehicle. Because the chassis remains directionally constant and the wheels remain parallel to one another, turning appropriately to the changing direction of the vehicle, the wheels each roll out equal arcs, traveling at the same rate.

The described vehicle has the ability to rotate about a point, that is, if the operator turns the steering wheel, she can rotate to face any direction.

Because the cab and wheels are always parallel, and rotation of the steering wheel causes an instantaneous, equal rotation of all wheels and cab, directional response is virtually immediate. The vehicle is highly responsive to the operator.

Because the chassis is directionally constant, the effective moment of inertia of the vehicle is decreased, decreasing the amount of force required to change the vehicle's direction, allowing for more of the traction to be used in cornering.

As the vehicle goes through a turn, the operator turns the steering wheel continuously in one direction. Because the cab and all wheels are always parallel, and always point in the direction of motion, the steering wheel does not need to be returned.

While my above description contains many specificities, these should not be construed as limitations on the scope of the invention, but rather as an exemplification of one preferred embodiment thereof.

For example, the wheel assemblies should be equipped with drive and brake systems and suspensions appropriate for the application of the vehicle. The chassis could be of various shapes. The number of wheel assemblies is variable, from three to as many as needed for specific applications. It is not necessary that the wheels are spaced perfectly evenly about the chassis as long as the linkage reciprocates. The links from the cab to the wheel assemblies can vary. The shape of the cab in this embodiment is for clear generic description; its shape is completely variable and could support a body. The wheel assemblies could be adapted to have caster or camber if needed. The placement of one or more engines or motors is not described and could be located on the cab or on the chassis, on one or more of the wheel assemblies or wherever appropriate for specific applications. The size of the vehicle is variable from small to very large, and it is not restricted to a passenger vehicle. Finally, the wheel assemblies could be replaced with rudders for a water vehicle, runners for an ice and snow vehicle, or other directional control systems. Applications of this vehicle could vary for wheel chairs, automobiles, fork lifts, etc.

Accordingly, the scope of the invention should be determined not by the embodiment illustrated, but by the appended claims and their legal equivalents.

I claim:

1. An all-wheel steered vehicle, comprising:
   a) a chassis;
   b) a plurality of wheel assemblies, each wheel assembly having a vertical shaft mounted for rotation on the chassis, support means attached to the vertical shaft for mounting a horizontal axle, a wheel mounted for rotation on the axle, and a lever arm attached to the vertical shaft and extending to a free end spaced from said shaft, the free ends of all the lever arms being arranged in a circle;
   c) a circular linkage ring extending around the circle defined by said free ends and being pivotably connected to the free end of each lever arm, the lever arms when so connected being disposed such that all of the horizontal axles are parallel to one another, the linkage ring defining a first vertical axis;
   d) a cab mounted on the chassis for rotation about a second vertical axis which is offset from said first vertical axis;
   e) steering means for rotating the cab about the second vertical axis; and
   f) roller means connected to the cab and engageable with the linkage ring for revolving the first vertical axis of the linkage ring about the second vertical axis in response to rotation of the cab, the linkage ring causing the lever arms to rotate simultaneously and equally with respect to the chassis.

2. The all-wheel steered vehicle of claim 1 where the vertical shafts of each wheel assembly are mounted to the chassis about a circle equal in size to the circle defined by the free ends of the lever arms, the second vertical axis being at the center of this circle.

* * * * *